(12) United States Patent
Gorfajn et al.

(10) Patent No.: US 12,464,458 B1
(45) Date of Patent: Nov. 4, 2025

(54) NETWORKED CAMERA DEVICE ADAPTED TO TEMPORARILY INCREASE ITS LISTENING FREQUENCY

(71) Applicant: Amazon Technologies, Inc., Seattle, WA (US)

(72) Inventors: Julian Gorfajn, Brookline, MA (US); Hendrick Haataja, Somerville, MA (US); Erik Cokeley, Pottstown, PA (US); Aleksei Dolgoborodov, Newtonville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 322 days.

(21) Appl. No.: 18/344,378

(22) Filed: Jun. 29, 2023

(51) Int. Cl.
*H04W 52/02* (2009.01)
*H04W 84/12* (2009.01)

(52) U.S. Cl.
CPC ........ *H04W 52/0216* (2013.01); *H04W 84/12* (2013.01)

(58) Field of Classification Search
CPC .......................... H04W 52/0216; H04W 84/12
See application file for complete search history.

(56) References Cited

U.S. PATENT DOCUMENTS

| | | |
|---|---|---|
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |

(Continued)

*Primary Examiner* — Ayanah S George
(74) *Attorney, Agent, or Firm* — Eversheds Sutherland (US) LLP

(57) ABSTRACT

This disclosure describes techniques for enabling dynamic adjustment of a wake interval frequency based on detection of a prioritization event. In embodiments, such techniques may comprise operating a STA device in a first mode in which wake intervals recur after a first amount of time and receiving, by the STA device from a AP device, information about a prioritization event. Based on receiving the information, the techniques may further involve operating the STA device in a second mode in which wake intervals recur after a second amount of time and, based on determining that the prioritization event has ended, operating the STA device in the first mode.

29 Claims, 6 Drawing Sheets

(56) References Cited

U.S. PATENT DOCUMENTS

| | | |
|---|---|---|
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,567,710 B2 * | 2/2020 | Modestine ............ H04L 45/026 |

\* cited by examiner

NETWORKED CAMERA DEVICE ADAPTED TO TEMPORARILY INCREASE ITS LISTENING FREQUENCY

BACKGROUND

Various devices may connect to a wireless local area network (WLAN) system (e.g., motion sensors, bridge network extenders, cameras or other recording and communication devices, smoke detectors, automation devices, smart-home hub devices, pet trackers, lights, virtual assistants, etc.). These devices may be placed in different locations inside or outside of a home, or in any location on a property. These devices may communicate with one another and/or with other devices such as servers via the WLAN.

Such devices (e.g., STAs) in communication with the network may connect to various access points (APs) to communicate. The devices may reduce their energy consumption by regularly going into a sleep mode during which communication hardware is shut off. In such devices, time synchronization might be used, in which transmission of packets to the device is synchronized based on the time instances in which a radio for the device comes out of sleep mode (i.e., enters an awake interval). This enables the device to, for example, only turn on its radio for short durations to receive packets and to keep its radio off otherwise.

Networked camera devices, such as security camera devices and video doorbell devices, are increasingly ubiquitous. Such networked camera devices can be connected to a WLAN such as a WiFi network provided by a wireless access point connected to a wide area network (WAN) such as the Internet. A networked camera device can communicate generated video data via the WLAN and the Internet to a remote system.

Some networked camera devices are also adapted to communicate notifications regarding events they detect. These events may be detected based on image or video data generated by a camera of a networked camera device or based on sensor data generated by one or more sensors of a networked camera device (e.g., a motion detector). As a specific example, some camera devices include a passive infrared sensor operating as a motion detector and are configured to send a motion detection event notification to a remote system based on detection of motion using the passive infrared sensor. As another specific example, some camera devices are configured to send a motion detection event notification to a remote system based on analysis of image data generated by a camera of the camera device. In some systems, based on receiving such a motion detection event notification, a remote system will send an alert to a user device of a user associated with the camera device. Some of these systems will display to the user via a display of the user device an interface that allows the user to initiate a live view that will stream video captured by the camera of the camera device for which a notification was received. Some systems will also allow a user to initiate a live view via his or her user device even when a notification has not been received.

In some such systems, when a user indicates via an interface of an app or web page that he or she wishes to initiate a live view for a camera device, data indicating this will be sent from the user's device to a remote system, and the remote system will then affect communication of data indicating this to the camera device.

In some systems, this may be communicated to the camera device via a WiFi network the camera device is connected to. In some systems, this may be communicated to the camera device via another network that the camera device is connected or associated with, for example, a sub-GHz network.

In some systems, a camera device is adapted to periodically listen for messages, for example, messages indicating that a live view has been initiated. For camera devices that are battery powered instead of being connected to a line power source, how often the camera device listens for messages can have a significant impact on battery life of the device.

Some solutions have been proposed for addressing similar issues in the context of a keep-alive interval for a camera device. See, e.g., U.S. Pat. No. 10,567,710. Specifically, it has been proposed to adjust a keep-alive interval based on a frequency of motion events detected by a video doorbell device, a frequency at which a front button of the video doorbell device is pressed, an ambient temperature, a charge level of a battery of a video doorbell device, or an intensity and/or duration of sunlight received at a solar panel connected to a video doorbell device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
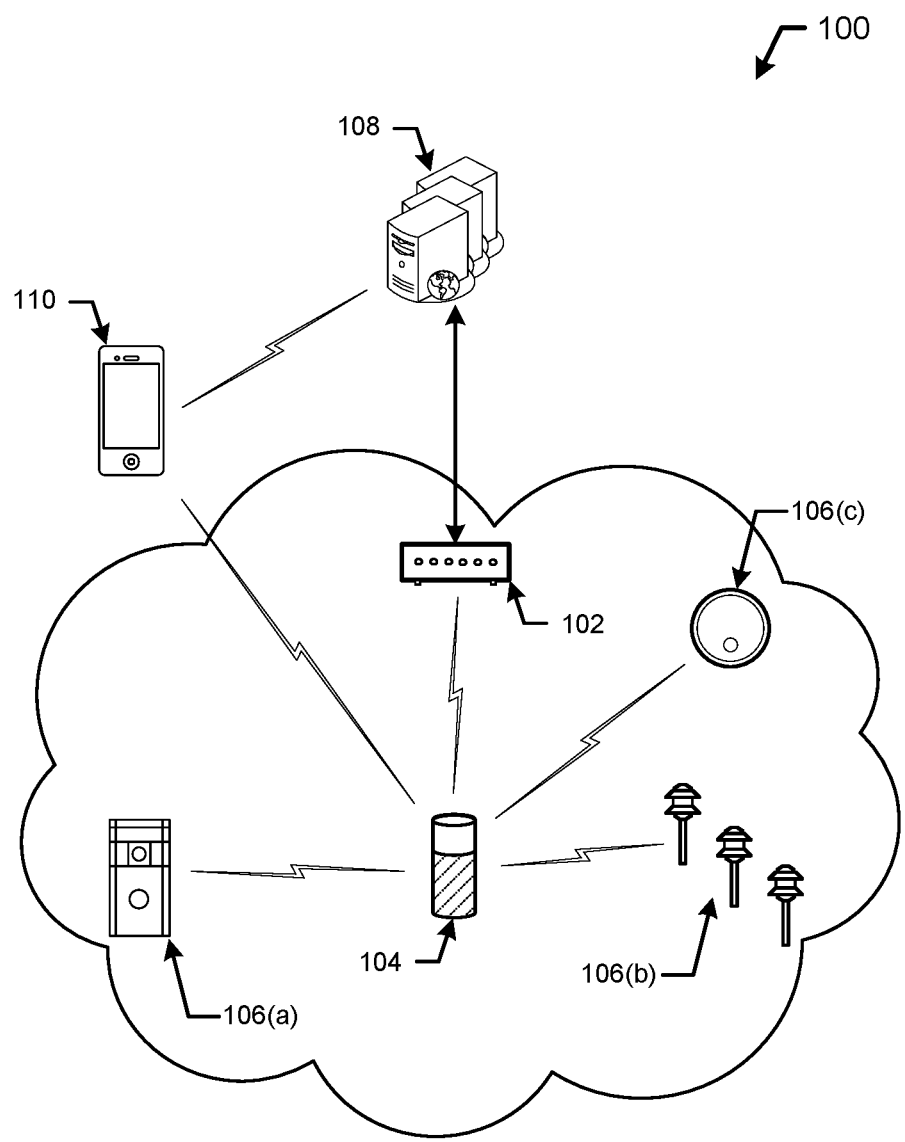
FIG. 1 depicts an example network environment that may be implemented in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

This disclosure describes, in part, techniques for enabling devices, such as camera devices, to operate in a low power mode without compromising device responsiveness.

In such techniques, a device can enter a low power mode in which one or more components are powered down. The device can be configured to power up these components (or wake them up) periodically for a wake interval. A period of time that components remain powered up or a period of time that a powered component is listening or performing other operations can be characterized as a wake interval or listening interval. A period of time that components remain powered down or in a low power mode can be characterized as a sleep interval.

An interval of time used to determine when to power up one or more components can be characterized as a sleep interval or a wake-up interval, e.g., a device might be configured with a two second wake-up interval value that causes it to power on a transceiver every two seconds.

In accordance with one or more implementations, upon occurrence of an event (e.g., receipt of a message indicating that a user has opened an app associated with the device, a motion detection event, completion of a requested command, receipt of a specific command, etc.), a device is configured to reduce (or otherwise adjust) the amount of time between wake intervals in order to increase responsiveness of the device. In embodiments, this adjustment may be made for a predetermined amount of time before the amount of time between wake intervals is increased to its original amount.

Embodiments of the disclosure provide for a number of advantages over conventional systems. For example, while many devices may operate using a low-power mode in which a STA device powers down a radio transceiver for substantial periods of time in order to conserve power, operators are often forced to make a choice between decreased power usage (resulting from larger amounts of time between wake intervals) and decreased response times (resulting from smaller amounts of time between wake intervals). In other words, devices that use a static amount of time between wake intervals will need to sacrifice either responsiveness or battery power. In contrast, embodiments of the disclosure enable a device to operate in a manner that minimizes battery consumption for the majority of time but increases responsiveness when the device is predicted to be needed, resulting in optimizing both battery consumption and responsiveness.

In embodiments, the AP device and the STA devices communicate using a one of a number of sub-gigahertz (GHz) communication protocols with low bandwidth, an exemplary which protocol can be characterized as a low-frequency radio (LFR) protocol operating with a Gaussian frequency-shift keying (GFSK) modulation scheme, e.g., enabling 50 kilobits per second (kbps). For example, the AP device and the STA devices may communicate using a low-bandwidth sub-GHz communication protocol (such as LFR) to register the STA device with the AP device and/or to transmit command and control (C&C) signals (e.g., transmit management frames and/or control frames from the AP device to the STA devices).

In accordance with one or more implementations, an electronic device may be configured to communicate over both a sub-GHz wireless network and another wireless network, e.g., a WiFi network. In accordance with one or more implementations, a system includes a modem configured to provide connectivity to a wide area network (e.g., connectivity to the Internet) via a wired or wireless connection (e.g., via LTE or 5G, or via cable). In accordance with one or more implementations, a wireless router is coupled to the modem and is configured to operate as an access point for a WiFi network, and to enable communications over the WAN for devices that communicate over the WiFi network. In accordance with one or more implementations, a single device may operate as a modem and wireless router. In accordance with one or more implementations, a sync module is coupled to the WAN (e.g., coupled wired or wirelessly to a modem, router, or combined electronic device), and operates as an access point for a sub-GHz network, enabling communications over the WAN (e.g., through a WiFi network) for devices that communicate over the sub-GHz network. In accordance with one or more implementations, a single device operates as both a sync module and wireless router, e.g., operates as an access point for both a sub-GHz network and a WiFi network. In accordance with one or more implementations, a camera device is connected to both a sub-GHz network and a WiFi network and operates as a station device for purposes of both networks. In accordance with one or more implementations, a sync module is configured to send command and control messages to the camera device over a sub-GHz network. In accordance with one or more implementations, a camera device sends image data (e.g., video data) over a WiFi connection to a sync module or router for communication to a remote system via a WAN (e.g., the Internet).

In accordance with one or more implementations, a camera device receives, using a wireless receiver adapted for sub-GHz communications, a beacon associated with a sub-GHz network transmitted by a sync module, and responds. The camera device then receives another message transmitted by the sync module which includes an indication of a time slot for communications to the camera device over the sub-GHz network. The time slot may be, for example, a 100 ms time slot that occurs once every second. This time slot represents a listening time slot during which the camera device will listen for communications over the sub-GHz network, e.g., power on its sub-GHz receiver and attempt to detect a wireless packet by attempting to recognize a preamble of a wireless packet within signal received using the sub-GHz receiver.

In accordance with one or more implementations, a camera device is configured to receive command and control information from a sync module or other electronic device via a wireless network such as a sub-GHz wireless network. In accordance with one or more implementations, a camera device is configured to power down, during sleep periods, a wireless communication component (e.g., a wireless transceiver or wireless radio) used for wireless communications over the wireless network. In accordance with one or more implementations, a camera device is configured to wake-up to listen for commands based on defined wake or listen periods. In accordance with one or more implementations, these wake or listen periods are defined as an amount of time between wake periods, e.g., an amount of time from the start of one wake period to the start of the next wake period, or an amount of time from the end of one wake period to the start of the next wake period, etc.

In accordance with one or more implementations, an amount of time between wake periods is adjusted based on receipt of a message or command, occurrence of an event, or completion of a command.

In accordance with one or more implementations, an app loaded on a user device is adapted to allow a user to initiate a live view to stream video from a camera device. The app is adapted to periodically poll a remote system.

In accordance with one or more implementations, a remote system is configured to, based on receiving a polling message from a user device (or other message indicating that a user has opened or has open the app associated with live viewing of video from a camera device), send a message to a sync module to send or broadcast a warm up command or other message that indicates one or more camera devices to reduce an amount of time between wake or listen periods. The message to the sync module may indicate one or more camera devices associated with a user account associated with the user device for which the warm up command or message is to be sent. The message to the sync module may specify an amount of time between wake or listen periods to use, e.g., 1 second, and may specify an amount of time to utilize such an increased wake-up frequency. The sync module may then send or broadcast such a warm up command or other message. The warm up command or other message comprises data indicating to reduce an amount of time between wake or listen periods. The warm up command or other message may specify an amount of time between wake or listen periods to use, e.g., 1 second, and may specify an amount of time to utilize such an increased wake-up frequency. The warm up command or other message may be broadcast to all devices in an area or all devices associated with the sync module, or may be sent only to one or more specific devices. In accordance with one or more implementations in which a warm up command or other message is broadcast, a sync module stores data indicating when an increased wake-up frequency will cease to operate. In accordance with one or more implementations in which a warm up command or other message is sent to one or more specific devices, a sync module stores data indicating, for each specific device, when an increased wake-up frequency will cease to operate.

In accordance with one or more implementations, an amount of time between wake periods is adjusted based on sensor data.

In accordance with one or more implementations, a camera device includes a motion detector or sensor such as a passive infrared sensor, and the camera device is configured to adjust an amount of time between wake periods based on motion detection by the motion sensor.

In accordance with one or more implementations, a camera device is configured to communicate sensor or event data to a remote system via a sync module, and the sync module and/or the remote system are configured to adjust an amount of time between wake periods based on sensor or event data as noted hereinabove with respect to description of a warm up command or other message.

In accordance with one or more preferred implementations, a camera device is configured to activate a camera and generate image data in the form of a snapshot at periodic intervals, e.g., once every ten minutes or once every hour.

In accordance with one or more preferred implementations, a camera device is configured to activate a camera and generate image data in the form of video in response to user input via an app loaded on a mobile device of a user, e.g., in response to a request to view a live video feed from the camera device.

In accordance with one or more implementations, a camera device is configured to begin generating and storing or transmitting image or video data based on a motion detection event, e.g., motion detection by a motion detector or sensor such as a passive infrared sensor. In accordance with one or more implementations, a camera device is also configured to reduce an amount of time between wake periods based on a motion detection event.

A passive infrared sensor may comprise, for example, two pyroelectric sensing elements. Each pyroelectric sensing element comprises a pyroelectric crystal. Each pyroelectric sensing element generates an electrical charge in response to heat. Radiation (e.g., infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g., junction field effect transistors) or operational amplifiers are used to convert charge into a signal voltage.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A device may comprise one or more lenses configured to direct light received at the one or more lenses onto one of the pyroelectric sensing elements. A device may include one or more lenses configured to direct light received at a first portion of the one or more lenses (e.g., a left portion) onto a first of the pyroelectric sensing elements (e.g., a left sensing element), and to direct light received at a second portion of the one or more lenses (e.g., a right portion) onto a second of the pyroelectric sensing elements (e.g., a right sensing element). The one or more lenses may comprise one or more Fresnel lenses having one or more features configured to direct light. The pyroelectric elements may be positioned side by side and aligned along an axis (e.g., a horizontal axis or a vertical axis).

A passive infrared sensor may be analog, with an analog signal output, or may be digital, with digital data output generated utilizing an analog-to-digital converter (ADC).

An electronic device (such as a camera device) may include one or more passive infrared sensors that the electronic device uses to detect motion of objects. Each passive infrared sensor may output a signal or sensor data, where the electronic device uses a characteristic determined using the signal or sensor data to determine whether the passive infrared sensor detected an object. The characteristic may include a voltage represented by the signal or sensor data, an amplitude of a wave generated or determined using the signal or sensor data, an angle of the wave generated using the signal or sensor data, and/or the like.

For example, a first passive infrared sensor may have a first field of view (FOV) that extends a first distance from the electronic device. In some examples, the first FOV is created based on placing the first passive infrared sensor in a first direction and/or using one or more lenses (which may be a lens of the passive infrared sensor or which may be a lens used in addition to or in replacement of a lens of the passive infrared sensor).

In accordance with one or more preferred implementations, a passive infrared sensor includes an integrated circuit (IC) component that receives voltage inputs from one or more lines coupled to a first PIR sensing element and a second PIR sensing element. In accordance with one or more preferred implementations, the IC component receives an input from each sensing element, while in accordance with one or more preferred implementations, the IC component receives a summed voltage.

In accordance with one or more preferred implementations, the IC component determines whether a summed voltage exceeds a first threshold, and, if so, sends a logic signal (e.g., a Boolean value or an interrupt) to a controller (e.g., a microcontroller unit or MCU) of an electronic device. Based on the received logic signal, the controller begins periodically polling or requesting PIR data (e.g., a most recent data value at the time of polling) from the IC component. For example, the controller may poll the IC component at a rate of 64 Hz. In accordance with one or more preferred implementations, the logic signal represents an interrupt that triggers additional processing.

In some example systems, if motion is detected in an environment monitored by a motion sensor such as a PIR sensor, the triggered motion sensor may send a signal to a controller of a camera device comprising the motion sensor. The signal may be effective to cause the camera device(s) to begin capturing image data and/or video data. For example, camera device comprising a PIR sensor may be situated in a particular room of a building. If the PIR sensor is triggered (e.g., due to a human walking through the room), the PIR sensor may send a signal to the controller of the camera device indicating that motion has been detected by the PIR sensor. In response to receipt of the signal from the PIR sensor, the camera device may be configured to begin capturing video. As noted above, in accordance with one or more implementations, a camera device is also configured to reduce an amount of time between wake periods based on a motion detection event.

FIG. 1 depicts an example network environment that may be implemented in accordance with one or more embodiments. The example network 100 may include a router 102 (e.g., a wireless router), one or more AP device 104, and a number of STA devices (e.g., endpoint devices) 106 (a-c). The router 102 may be in communication with one or more remote systems 108. In some embodiments, a user device 110 may connect to one or more devices within network environment 100 or to the remote systems 108.

A router 102 may include any suitable electronic device configured to provide ingress/egress to the network 100 (e.g., a gateway). In some embodiments, the router device 102 enables communication between devices in the network 100 and devices outside the network 100 (e.g., via a second network). An example of router device 102 may include a router, routing switch, integrated access device, multiplexer, or any other suitable device. While depicted as being separate from an AP device 104, it should be noted that a router device 102 may also function as an AP device 104.

An AP device 104 may be an electronic device having hardware and functionality to communicate with various STA devices (e.g., the STA devices 106), as well as communicate with other devices on the network 100 (e.g., router 102). In various embodiments, the AP device 104 may be any of a virtual assistant (VA) device, a hub device of a security/alarm or home automation system, a bridge device for extending range of a wireless network, an audio/video recording and communication device (A/V device) such as a video doorbell, etc.

The AP devices 104 may include the hardware and functionality to communicate with the server(s) 108 over the network 100 (e.g., a WiFi network) by communicating with a router 102 using one wireless protocol, and the AP devices 104 may also have the hardware and functionality to communicate with the STA devices 106 using a different wireless protocol, such as a 900 megahertz (MHz) band of channels. The AP devices may also be configured to operate as an access point for two networks, e.g., a sub-GHz network and a WiFi network, or a first sub-GHz network adapted for a first data rate and a second sub-GHz network adapted for a second, higher data rate. The AP devices may even be configured to operate as an access point for three networks, e.g., a WiFi network, a first sub-GHz network adapted for a first data rate and a second sub-GHz network adapted for a second, higher data rate. In some cases, the STA devices 106 may be connected to a respective AP device via a high data rate connection such as a WiFi connection. In some cases, an STA device may communicate with an AP device over a sub-GHz network or WiFi network, and the AP device may enable communications onward to a remote system, e.g., via a WiFi network or wired connection.

In various embodiments, other wireless protocols may be used for the AP devices 104 to communicate over the devices on the network 100 and/or with one another. In various embodiments, the AP devices 104 may also communicate using wired connections, such as through an Ethernet cable connecting one or more of the AP devices 104 to a wired or wireless router in connection with the network 100. The AP devices 104 may also communicate using a combination of wired and wireless network components. In various embodiments, other wireless protocols and/or wired connections may also be used for communication between the AP devices 104 and the STA devices 106. In various embodiments, the AP devices 104 may communicate with one another over the same wireless protocol (e.g., a 900 MHz band of channels) that is used to communicate with the STA devices 106. Accordingly, the AP devices 104 have multiple communication interfaces for communicating with devices on the network 100 as well as with the STA devices 106. Other wireless or wired communication protocols that may also be used in various embodiments include, for example and without limitation, X10, RS-485, 6LoWPAN, Bluetooth LE (BLE), ZigBee, Z-Wave, and/or a low power wide-area networks (LPWAN), such as a chirp spread spectrum (CSS) modulation technology (e.g., LoRa) or network protocol (e.g., LoRaWAN), an Ultra Narrow Band modulation technology network (e.g., Sigfox, Telensa, NB-IoT, etc.), RingNet, and/or the like.

A STA device 106 may be any electronic device configured to communicate with other devices on the network 100. In some cases, the STA device is a wireless sensor node equipped with one or more sensors, computing hardware, radio transceivers, and power components. The individual STA devices in the network (e.g., a wireless sensor network (WSN)) may be inherently resource-constrained, in that they may have limited processing speed, storage capacity, and communication bandwidth.

A STA device might include an Internet of Things (IoT) device configured to perform an operation based on instructions provided remotely (e.g., from a mobile application) by receiving those instructions via the AP device 104. Some nonlimiting examples of a STA device 106 include a pet locating devices, sensors (e.g., motion sensors, smoke detectors), automation devices (e.g., lights, door locks, smart appliances), a mobile device (such as a mobile phone connected to the network 104), or an audio/video recording and communication device (A/V device) such as a video doorbell.

STA devices 106 may communicate with AP devices 104 using any suitable protocol. By way of non-limiting example, such communications may be Amazon Sidewalk SubG (referred to as SubG-FSK), LoRa® radio (referred to as SubG-CSS), or Bluetooth® Low Energy (referred to as BLE). In general, STA devices 106 and AP devices 104 communicate using frames. Frames can carry commands to control the connection, and/or data to communicate with a remote system.

STA devices 106 that are not actively communicating with AP devices 104 can enter a low power mode. In such cases, the STA device 106 may power down (or turn off) their radio transceivers while the STA device 106 is not communicating with the AP device 104. While the STA device 106 is in a low power mode, that STA device may periodically turn on its radio receiver at predetermined intervals (e.g., wake intervals) during which the STA device 106 can briefly receive any communications directed to it. If a communication is detected during one of these wake intervals, then the STA device 106 may exit the low power mode either until the communication is completed or a predetermined period of time has elapsed. Wake intervals may initially be set to recur after a predetermined amount of time. However, upon detection of certain events, that amount of time may be adjusted (e.g., decreased). For example, if a user of the user device 110 accesses a mobile application related to management of a video doorbell device (e.g., STA device 106 (*a*)) then the amount of time between wake intervals for that video doorbell device may be decreased. If the mobile application is then closed, or a predetermined amount of time elapses without any communications to the video doorbell, then the amount of time between wake intervals may return to its previous value. While this results in increased power usage by the video doorbell, it also enables the video doorbell to be more responsive to any received requests.

It should be noted that some electronic devices may perform as both an AP device 104 and a STA device 106. For example, an AP device 104 that receives a data packet from a STA device 106 may then relay that data packet to another AP device 104 in the network 100. In this example, the AP device 104 would perform as described herein with respect to an AP device when receiving the data packet from the STA device 106 but may then act as an STA device when transmitting the data packet to the second AP device. Each of the STA devices 106 may be paired with one or more AP device 104 so that the STA devices 106 may be communicated with via the respective AP device 104.

In some cases, for a STA device 106 to operate on a network in which the network environment 100 is implemented, that STA device 106 must first be connected to the network. In embodiments, the network supports both synchronous and asynchronous connection modes for an end-point device. In a synchronous mode, the STA device 106 may synchronize with a single AP device 104 before communicating with other electronic devices in the system through that AP device 104. In an asynchronous mode, a STA device 106 transmits messages that can be received by multiple AP devices 104.

STA devices 106 that are associated with a particular service may first need to register with an operator of that service before they can begin communicating with the other electronic devices in the network environment 100. In some embodiments, such registration requires keys that are provisioned onto the STA device 106 (e.g., at the time of manufacture). In some embodiments, a key may be a string of characters that is unique to the STA device 106 or a type associated with that STA device 106. A key may be stored in a secure memory of a STA device 106. In some cases, the key may be encrypted or otherwise subjected to access controls.

The remote system 108 may be any suitable computing device or combination of computing devices configured to manage information collected via the STA devices 106 as described herein. In some embodiments, the remote system 108 is configured to provide instructions to one or more of the STA devices 106 via an AP device 104. In embodiments, the remote system 108 is configured to interact with a user device or other remotely located electronic device (e.g., via an application installed upon, and executed from, the user device).

In embodiments in which the remote system 108 uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The user device 110 may include any suitable electronic device configured to interact with other electronic devices on a network. In some non-limiting examples, the user device 110 may be a variety of devices including, for example: a mobile phone, a personal data assistant (PDA), or a mobile computer (e.g., a laptop, notebook, notepad, tablet, etc.) having mobile wireless data communication capability. In some embodiments, communications between the user device 110 and one or more other electronic devices of the network 100 may be facilitated via a software application (e.g., a mobile application) that is installed upon, and executed from, the user device 110.

The network 100 may include any wireless network, any wired network, or a combination thereof, configured to operatively couple the modules, devices, components, and/or systems as illustrated in FIG. 1. For example, the network 100 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
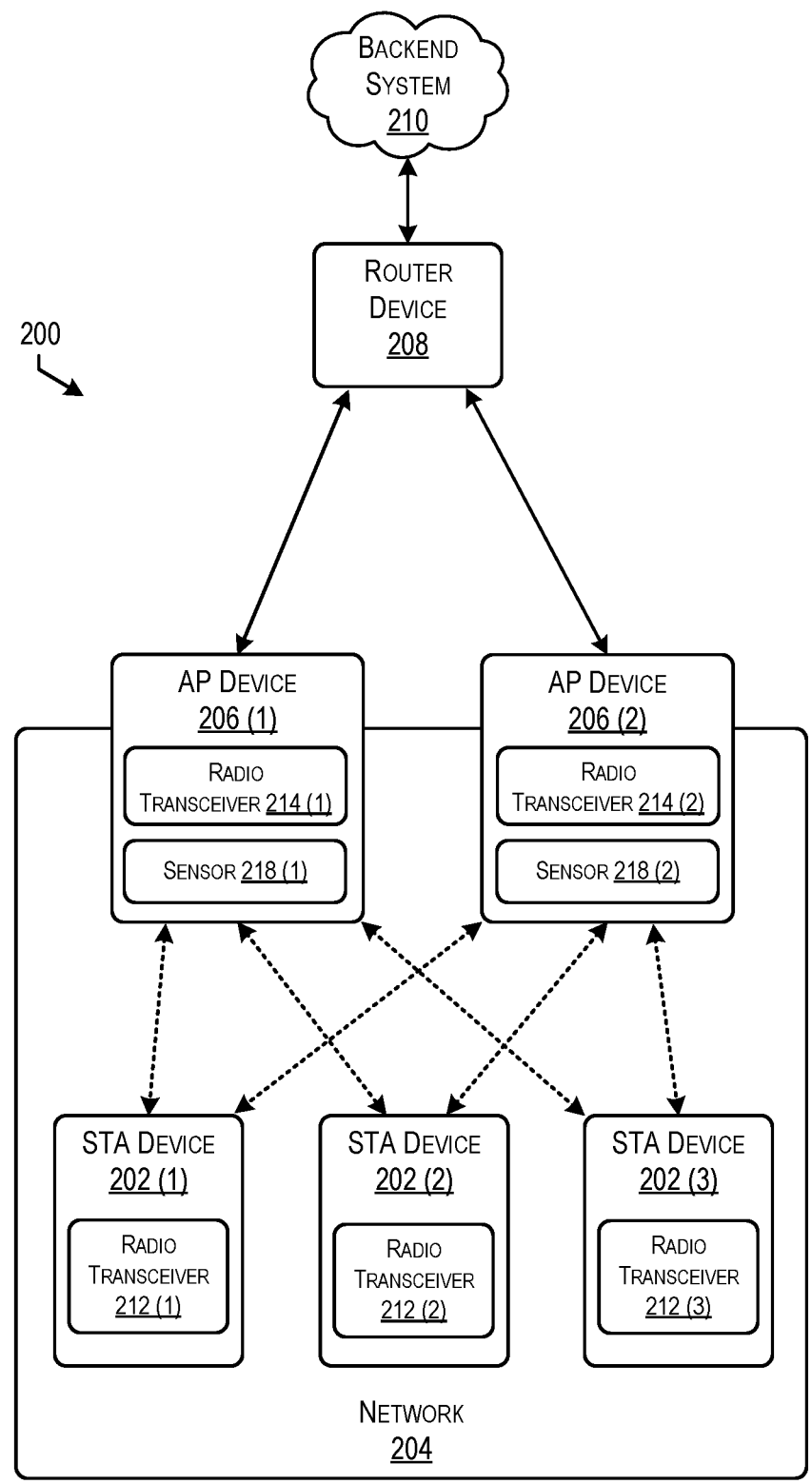
FIG. 2 depicts an example environment in which a system may be implemented to adjust listening intervals based on event detection in accordance with at least some embodiments.

FIG. 2 depicts an example environment in which a system may be implemented to adjust wake-up intervals based on event detection in accordance with at least some embodiments. An exemplary system as depicted with respect to environment 200 may include a number of STA devices 202 (1-3) included in a network 204. The network 204 may further include a number of access point (AP) devices 206 that enables communication between the various components within the network 204 as well as with a router device 208 that provides access to one or more electronic devices outside of the network 204, such as one or more remote system 108 implemented within a backend system 210. It should be noted that the network 204 may include multiple STA devices 202 and AP devices 206. It should be noted that STA devices 202, AP devices 206, and router device 208 may each be examples of the respective STA devices 106, AP devices 104, and router device 102 as described in relation to FIG. 1 above.

As noted elsewhere, a STA device 202 may be any electronic device configured to communicate with other devices on the network 204. Each of the STA devices 202 (1-3) may include at least a respective radio transceiver 212 (1-3). The radio transceiver 212 may be configured to both transmit and receive communications between the respective STA device 202 and another electronic device. The STA device 202 may include medium access control (MAC) module or interface. A STA device 202 may include a physical layer module or interface for radio media, and the term "STA device" may, in its definition, include both an AP and a non-AP STA (station). In some cases, a single device might function as an AP device 206 in one transaction and a STA device 202 in another.

The network 204 may include any suitable local network of devices. In some embodiments, such a network 204 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. As noted above, the network 204 may include a wireless sensor network (WSN). In embodiments, the network 204 may be configured as a low-power (LP) version of a network type, such as a LPWAN. The devices in the network 204 might operate in either synchronous or asynchronous mode.

As noted elsewhere, an AP device 206 may include any electronic device that facilitates communication between the various components in the network 204. In embodiments, the AP device 206 is a device that allows the management (control) of the network 204 and aggregates the information received from the STA devices 202 to send real-time, or near real-time, data to a router device 208. The AP device 206 may include one or more processors and a memory that stores computer executable instructions for implementing at least a portion of the functionality described herein.

Each of the AP devices 206 (1-2) may include one or more radio transceivers 214 (1-2). The one or more radio transceivers 214 may be configured to both transmit and receive communications between the respective AP device 206 and another electronic device (e.g., a STA device 202 or router device 208).

In embodiments, the AP device 206 is configured to send and/or receive periodic transmissions to and/or from one or more of the STA devices 202. Each of the STA devices 202 may operate in a sleep mode for some predetermined amount of time (e.g., a sleep interval). In some cases, the amount of time that each STA device 202 spends in the sleep mode may (at least initially) be a default amount of time as set by a manufacturer or distributor of the STA device 202. In some embodiments, the amount of time that each STA device 202 spends in the sleep mode may be determined by the AP device 206. In these embodiments, the AP device 206 may provide instructions to each STA device 202 to set a sleep interval of the length of time as determined by the AP device 206. The AP device 206 may be configured to identify the sleep intervals associated with each of the STA devices 202 and may schedule periodic transmission times (e.g., transmit events) to occur during wake intervals for the STA devices 202.

The STA device 202 may be configured to dynamically adjust a frequency of its wake intervals (e.g., a sleep interval) based on information received from the AP device 206. For example, the STA device 202 may initially be configured to have wake intervals occur once every two seconds. Upon detecting an event (e.g., a prioritization event), an AP device 206 may provide instructions to the STA device 202 to cause the frequency of wake intervals to be increased. In this example, the STA device 202 may be configured to increase its frequency of wake intervals to once every second. Note that the frequency of wake intervals in this example, may be determined by the AP device 206 (and sent to the STA device) or by the STA device 202 itself. In some cases, the frequency of the wake intervals that is set by the STA device 202 may correspond to a type or category of the prioritization event.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Figure 3:
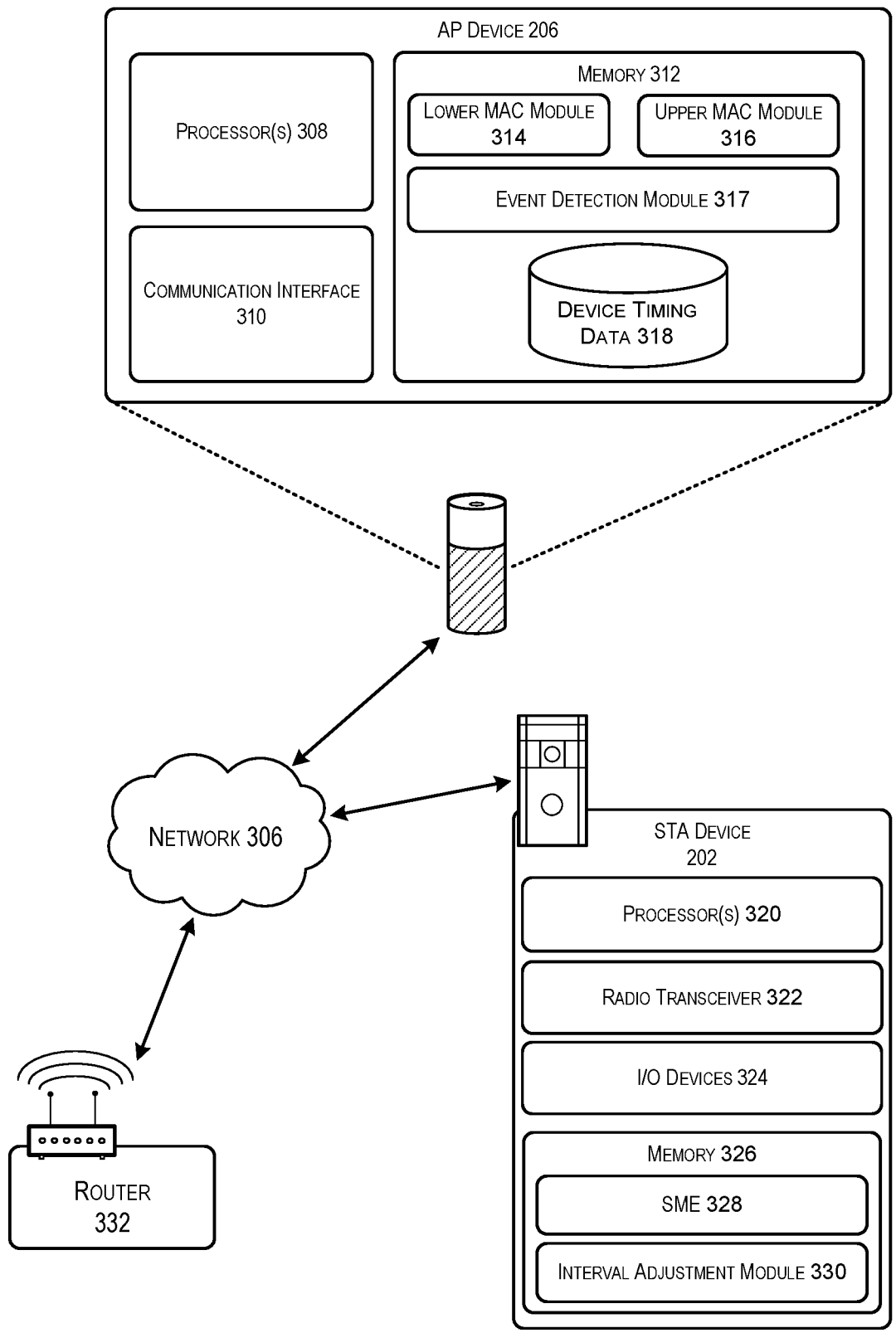
FIG. 3 depicts a system architecture that may be implemented in which wake intervals for a STA device are adjusted dynamically in accordance with at least some embodiments.

FIG. 3 depicts a system architecture that may be implemented in which wake intervals for a STA device are adjusted dynamically in accordance with at least some embodiments. As shown in FIG. 2, an AP device 206 may be in communication with at least one STA device 202 via a network 306. The AP device 206 and STA device 202 may be examples of the respective AP device 206 and STA device 202 as described in relation to FIG. 2 above.

As noted above, the AP device 206 may include any computing device configured to manage communications between a backend system and the STA devices 202 using communication techniques as described herein. As depicted, the AP device 206 may include a number of hardware components, such as one or more processors 308, a communication interface 310, and a memory 312.

As used herein, a processor 308 may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The communication interface 310 may be any component configured to enable data to be communicated between electronic devices. The communication interface 310 may include one or more network interface controllers (NICs) or other types of transceiver devices to send and receive messages over network(s). For instance, the communication interface 310 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (Wi-Fi), or any other PAN message protocol. Furthermore, the communication interface 310 may include a wide area network (WAN) component to enable message over a wide area network.

Memory 312 may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information, and which can be accessed by the processor(s) 308.

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the communication interface 310, the I/O devices of the respective apparatuses, and so forth, and provide various services to applications or components executing on the processor(s) 308. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (ENEA OSE) as promulgated by ENEA AB of Sweden; and so forth.

Turning to the contents of the memory 312 in more detail, the memory 312 may include an operating system and one or more application programs or services for implementing the features disclosed herein including a lower MAC module 314, an upper MAC module 316, an event detection module 317, and device timing data 318. The lower MAC module 314 may be a component of a MAC layer of the AP device 206 that interacts with a physical layer of the AP device 206. For example, the lower MAC module 314 may be configured to generate data frames corresponding to various communication protocols. In some cases, the lower MAC module 314 may be configured to generate Wi-Fi packets, low-bandwidth sub-GHz protocol frames (e.g., LFR frames), high-bandwidth sub-GHz protocol frames (e.g., frames corresponding to a protocol with a 900 MHz bandwidth), and/or the like.

In some cases, the lower MAC module 314 performs operations related to MAC protocol data unit transmissions and acknowledgement. In some cases, the lower MAC module 314 controls access to the connection medium associated with the AP device 206.

The upper MAC module 316 may be a component of the MAC layer of the AP device 206 that interacts with a logical link control layer of the AP device 206. For example, the upper MAC module 316 may be configured to associate the AP device 206 with a set of STA devices 202.

An event detection module 317 may be configured to, in conjunction with the processor 308, receive information from one or more sources and identify a potential prioritization event associated with one or more STA devices. Such information may be compared against information stored in relation to one or more known prioritization events in order to determine a likelihood that a particular prioritization event is occurring (e.g., based on a similarity between the information). In some cases, prioritization events may be associated with a particular STA device. For example, a prioritization event that relates to a user accessing a mobile application may be associated with an STA device that also relates to that mobile application.

In some cases, the one or more sources may include a user device and/or remote system. In embodiments, a user device may include a mobile software application associated with the operation of a STA device. For example, a user device may include a mobile application related to the operation of a video doorbell (e.g., an example STA device). In this example, the mobile application may provide a user of the user device with the ability to obtain video and/or audio as captured by the video doorbell. The mobile application may further provide the user with additional functionality, such as enabling communication between the user and a visitor in proximity of the video doorbell. In this example, information indicating that the user has accessed the mobile application (e.g., by executing the mobile application on his or her user device) may be received by the AP device 206 and used by the event detection module 317 to detect a prioritization event.

In some cases, the one or more sources may include an STA device. For example, an STA device may include one or more sensors configured to detect information about an environment in which the STA device is located. In this example, information obtained from the one or more sensors may be used to determine whether certain conditions have been met. In embodiments, the information about a detected event (based on detecting that one or more conditions have been met) or the sensor information itself may be provided by the STA device to the AP device to be used by the event detection module 317.

By way of illustration, a temperature sensor (e.g., a thermometer) included in a STA device may collect information about a current temperature surrounding the STA device. That temperature information may then be compared to a threshold temperature in order to determine whether an over-temperature condition has been detected.

In another illustration, a motion sensor such as a passive infrared sensor of a video doorbell device or other camera device may detect motion in its proximity. Upon collecting information from the motion sensor, the video doorbell device may provide that information to at least one AP device for use by the event detection module 317.

In embodiments, the event detection module 317, may, upon detecting a prioritization event, be further configured to determine a wake interval frequency to be implemented on at least one STA device determined to be associated with that detected prioritization event. In embodiments, the wake interval frequency to be set may be determined based on a level of responsiveness associated with the prioritization event as well as information about the STA device on which the wake interval frequency is to be set.

The event detection module 317 may retrieve information about a level of responsiveness that should be associated with the prioritization event. In some cases, such information may be retrieved from another electronic device (e.g., a remote system). In some cases, such information may be retrieved from a data store on the AP device itself (e.g., from device timing data 318). In embodiments, the level of responsiveness may be dependent upon a type or categorization of the prioritization event and/or a STA device associated with such a prioritization event. For example, a prioritization event that relates to a security system may require a much higher level of responsiveness than a prioritization event that relates to an IoT temperature sensor.

The event detection module 317 may retrieve information about the STA device on which the wake interval frequency is to be set. In some cases, this might include information about one or more capabilities of the STA device (e.g., a battery status, a maximum wake interval frequency, a clock drift for the STA device, etc.). In some cases, such information is retrieved from data stored on the AP device. In some cases, such information is retrieved through communications between the AP device and the STA device.

As noted above, the event detection module 317 may be further configured to determine a wake interval frequency to be implemented on the STA device. In some embodiments, wake intervals associated with a prioritization event may be set by a manufacturer or developer. For example, a manufacturer of a video doorbell may provide an indication of the wake interval frequency to be set on that video doorbell device upon detecting that a user has accessed the video doorbell mobile application (e.g., an example of the prioritization event). In some embodiments, wake intervals may be determined based on a level of responsiveness and information about the STA device. For example, a wake interval may be less frequent in STA devices that currently have a low battery power status as opposed to similarly situated STA devices that currently have a high battery power status. In another example, a wake interval may be more frequent for prioritization events that require a higher level of responsiveness as opposed to for prioritization events that require a lower level of responsiveness. Upon determining the wake interval frequency to be implemented on the STA device, the event detection module 317 may be further configured to provide that wake interval frequency to the STA device. In some embodiments, the event detection module 317 may also be configured to provide an indication of a time period over which the wake interval should be implemented.

As noted above, the STA device 202 may be any electronic device configured to communicate with other devices on a network 306. As depicted, the STA device 202 may include a number of hardware components, such as one or more processors 320, a radio transceiver 322, one or more input/output devices 324, and a memory 326.

Similar to that of the AP device 206, a processor 220 may include multiple processors and/or a processor having multiple cores. Likewise, memory 326 may include volatile and nonvolatile memory, removable and non-removable media implemented in any method or technology for storage of information.

A radio transceiver 322 may include any suitable combination of transmitter and receiver circuitry. In some embodiments, the radio transceiver 322 may be included in a network interface card included within the STA device 202. In some cases, the radio transceiver may be external to the STA device 202, in that it may be separate from the STA device 202 but coupled to the STA device 202 via a physical connection.

An input device of the I/O devices 324 may be any component configured to enable a user to provide input to the STA device. Such an input device may include, but is not limited to, a button, a touch-sensitive surface, a switch, a slider, and/or any other type of device that allows a user to provide input to the STA device 202.

An output device of the I/O devices 324 may be any component capable of providing an output signal to a user. In some cases, an output device may comprise one or more lights that are powered up to provide an output signal to a user. In some cases, an output device may be a speaker capable of producing sound in response to an electrical signal input.

Turning to the contents of the memory 326 in more detail, the memory 226 may include an operating system and one or more application programs or services for implementing the features disclosed herein including a station management entity (SME) 328 configured to manage operations of the STA device 202, and at least a module for adjusting a length of a sleep interval to be implemented by the STA device 202 (e.g., interval adjustment module 330).

The operation of a STA device in a WLAN system may be described in relation to a layer structure configured by the processor 320 in terms of a device configuration. The STA device 202 may include a plurality of layer structures. For example, the 802.11 standards relate to at least a MAC sublayer on a data link layer (DDL) and a physical (PHY) layer. The PHY may include a physical layer convergence procedure (PLCP) entity and a physical medium dependent (PMD) layer. The MAC sublayer and the PHY layer conceptually include management entities respectively called an MAC sublayer management entity (MLME) and a physical layer management entity (PLME). These entities provide a layer management service interface in which a layer management function works.

In some embodiments, operations performed by the STA device may be performed based on configuration settings stored on the STA device. In some cases, at least a portion of the configuration settings may be provisioned onto the STA device by a manufacturer or retailer of the STA device (e.g., during manufacture). In some cases, at least a portion of the configuration settings may be provisioned onto the STA device by a remote system. For example, a backend server may provide a number of configuration settings to at least one AP device to be provisioned onto the STA device (e.g., during a provisioning process). In some cases, one or more configuration settings may be provided by a user (e.g., an owner or operator) associated with the STA device. In a first example, the user may input information to be used in setting configuration settings via an input mechanism (e.g., a touch-screen display) included in the STA device. In a second example, the user may provide input to a user device (e.g., a mobile device) that can then be relayed to the STA device.

To provide an accurate MAC operation, a SME 328 may be present in each STA device 202. The SME 328 is a layer-independent entity that is present in a separate management plane or can be seen to be off to the side. Although accurate functions of the SME 328 are not illustrated in detail in this disclosure, the SME 328 may generally function to collect a layer-dependent state from various layer management entities (LMEs) and to similarly set the values of layer-specific parameters. Generally, the SME 328 may perform these functions on behalf of a general system management entity and may implement a standard management protocol.

An interval adjustment module 330 may be configured to, in conjunction with the processor 308, adjust an amount of time between wake intervals for the STA device 202. In embodiments, the STA device 202 may receive an indication of the amount of time to be implemented between wake intervals from an AP device (e.g., as received from the event detection module 317). In some embodiments, the interval adjustment module 330 is configured to change the amount of time between wake intervals over a period of time and then return that amount of time to a default value. In some cases, the period of time may be a default period of time associated with, and maintained by, the STA device. In some cases, the period of time may be determined by the AP device (e.g., based on a type or category of a detected prioritization event) and provided by the AP device to the STA device.

By way of example, a STA device 202 may initially operate having wake intervals that occur every 1 second. In this example, the STA device may receive instructions from an AP device 206 to set wake interval to occur every 2 seconds. The STA device may also receive an indication that the wake intervals should be increased for a period of ten minutes. Accordingly, the interval adjustment module 330 may increase the frequency of wake intervals by decreasing the amount of time between those wake intervals to 1 second. After 10 minutes of increased wake interval frequency, the interval adjustment module 330 may then set the frequency of wake intervals back to its original frequency by setting the amount of time between wake intervals back to 2 seconds.

In some embodiments, the AP device 206 may further be in communication with a router device 332. Such a router device 306 may include hardware and/or software components that enable communication between the AP device 206 and one or more electronic devices located outside of the network 306.

During operation, a time synchronization mechanism may be used to time wake intervals during which a device is configured to receive information as well as to time the transmission of information to that device. This time synchronization mechanism may rely on local oscillator hardware that provides time reference for either the AP device and/or the STA device, even in sleep mode. These oscillators may have certain drift due to various factors such as aging, temperature variation, capacitor load imbalance, etc. This drift in the oscillators can result in mismatched timing between an AP and a STA.

For example, a STA device may be configured to wake up to receive beacons for a wireless network it is connected to. The STA device may determine a sleep or wake interval based on the beacon interval defined in a beacon interval field of a received beacon frame for the wireless network. A STA device may be configured to wake up for every beacon frame that is transmitted for a wireless network or may be configured to only wake up for a subset of transmitted beacon frames, e.g., for every third beacon frame.

Figure 4:
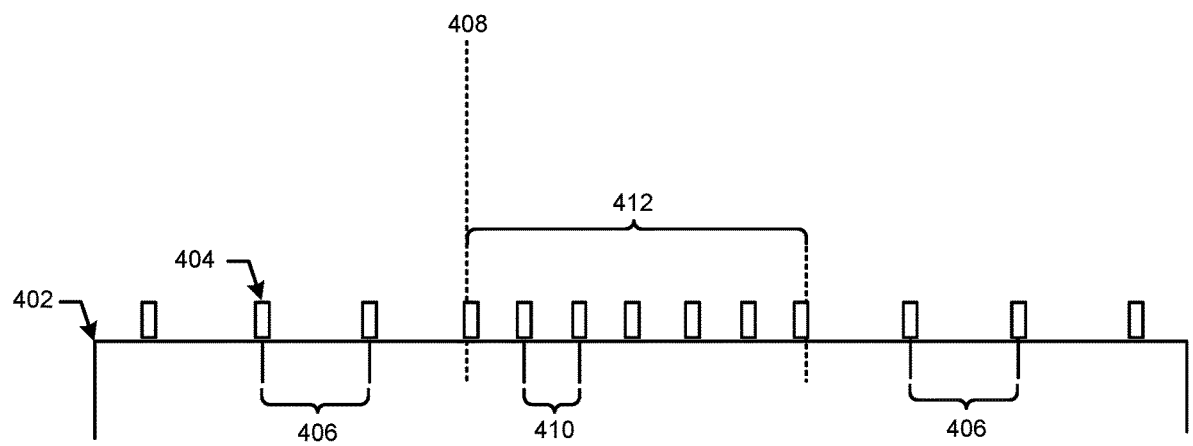
FIG. 4 depicts a conceptual view illustrating techniques for adjusting wake intervals based on event detection in accordance with some embodiments.

FIG. 4 depicts a conceptual view illustrating techniques for adjusting wake intervals based on event detection in accordance with some embodiments. The techniques discussed in relation to FIG. 4 are illustrated via an example timeline 402. As described elsewhere, when not currently communicating with another electronic device, a STA device may enter a low power (or sleep) mode in which the radio transceiver is substantially powered down.

During a low power mode, the STA device may power up its radio transceiver during a short window, referred to herein as a wake interval 404, in order to determine whether any communications are to be received by the STA device. During the wake interval 404, another electronic device (e.g., an AP device) may initiate communication with the STA device. If the STA device receives a communication during the wake interval, then the STA device may keep its radio transceiver powered up until an interaction associated with that communication has been completed.

By way of example, during a wake interval, an STA device may receive a request for certain data (e.g., sensor data collected from a sensor of the STA device). In such an example, the STA device may continue to operate its radio transceiver until the request data has been successfully transmitted in response to the request. In this illustrative example, once the transmission has been completed, the STA device may return to the low power mode until another communication is received.

As noted elsewhere, the STA device may implement a default wake interval frequency by scheduling the wake intervals 404 (during which the radio transceiver is powered up to check for communications) to recur after a first time period 406. In such cases, the first time period 406 may be selected in order to minimize the amount of time that the STA device spends with its radio transceiver powered up.

As illustrated in FIG. 4, a prioritization event may occur at a time 408. Upon the occurrence of the prioritization event, the STA device may implement a new wake interval frequency by spacing each of the wake intervals 404 to recur after a second time period 410 instead of the first time period 406.

In embodiments, the STA device itself may detect the prioritization event at time 408 and may adjust its wake interval frequency based on that detection. For example, the STA device may be a video doorbell device. In this example, a prioritization event may be detected upon the video doorbell detecting motion (e.g., via one or more motion sensors), a visitor (e.g., upon a doorbell button being pressed), a lowered or raised light level (e.g., via one or more light sensors), or based on any other suitable information collected by the video doorbell.

In embodiments, the STA device may receive instructions from an AP device at time 408 to adjust its wake interval frequency. In some cases, the instructions may include an indication of the wake interval frequency to be implemented by the STA device. In some cases, the instructions may cause the STA device to switch between a default wake interval frequency and a prioritized wake interval frequency that are each stored by the STA device. In some cases, the instructions may further include an indication of a period of time 412 over which the wake interval frequency should be adjusted.

In embodiments, the wake interval frequency of the STA device may be adjusted for a predetermined period of time 412. At the expiration of the period of time 412, the STA device may implement the old wake interval frequency by spacing each of the wake intervals 404 to recur once more after the first time period 406 instead of the second time period 410. As pointed out above, an indication of such a period of time may be received by the STA device along with the instructions from the AP device. Alternatively, the period of time 412 might be a default period of time.

Figure 5:
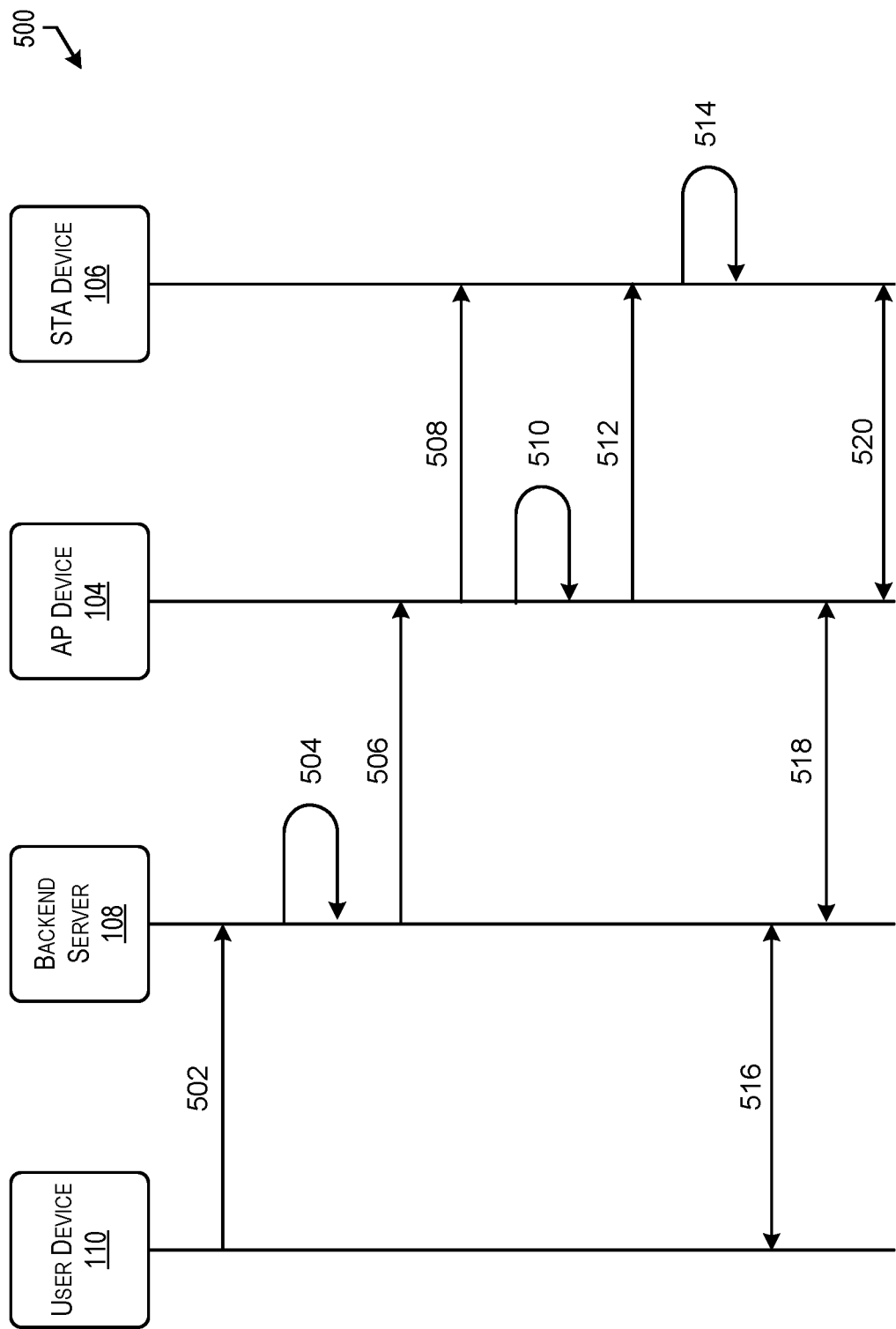
FIG. 5 depicts a swim lane diagram illustrating interactions that may be implemented between various components of a system as described herein.

FIG. 5 depicts a swim lane diagram illustrating interactions that may be implemented between various components of a system as described herein. More particularly, the process 500 depicts interactions between a user device 110, a remote system 108, a AP device 104, and a STA device 106. Each of the user device 110, remote system 108, AP device 104, and STA device 106 may be examples of the respective components as described in relation to FIG. 1 above.

In some embodiments of the process 500, information may be received at a remote system from a user device at 502. In some cases, the information is received in response to one or more actions taken by a user of the user device. For example, the user may execute a software application installed upon the user device. In this example, the software application may be configured to interact with the remote system via an application programming interface (API) and the remote system receives information related to the user's accessing the software application. In some cases, the information is received in response to one or more conditions being met by the user device, regardless of actions taken by the user. For example, a location of the user device (as obtained by a global positions system (GPS) included in the user device) may be monitored by an application running in the background of the user device. In this example, if the user device enters a geographic area (sometimes referred to as a geofence), the user device may be configured to relay that information to the remote system.

Upon receiving information from a user device, the remote system may process that information at 504 to identify one or more STA devices that may be affected by the information at 506. In some cases, this may involve identifying a user account maintained by the remote system in relation to the user device as well as one or more STA devices that are also associated with that account. In some embodiments, information received from a software application on the user device may be used to identify the STA devices. For example, the software application may provide one or more STA device identifiers to the remote system via an API. The remote system may then perform a lookup operation on those identifiers to identify the STA devices that are associated with the user device.

Upon identifying one or more STA devices that may be affected by the information, the remote system may identify one or more AP devices in communication with those STA devices. In some embodiments, such AP devices may be identified by virtue of being the latest AP device from which communications from the respective STA device were received. In some embodiments, such AP devices may be identified based on the respective STA devices having been registered on a network via those AP devices. At least a portion of the information received by the remote system may be relayed to the identified AP device(s) at 506.

In some embodiments, information may be received at an AP device 104 or remote system (e.g., via an AP device) from one or more STA devices 106 at 508. In some cases, such information may be sensor data collected from one or more sensors included in the STA device. In some embodiments, such information may indicate the occurrence of an event (e.g., a motion detection event).

At 510, information received by the AP device (or remote system) may be used to determine that a prioritization event has occurred. In some embodiments, this may involve comparing the received information (or a subset thereof) to a known information stored in relation to one or more prioritization events in order to identify a similarity or pattern.

Upon making a determination that a prioritization event has occurred (or is occurring), the AP device 104 or remote system may identify one or more STA device 106 to be associated with the prioritization event. In some cases, an STA device 106 may be determined to be associated with a prioritization event if there is a likelihood that the STA device 106 will be accessed during that prioritization event. For example, given a prioritization event in which a user has accessed a software application on his or her user device for a home security system, each of the STA devices that make up the security system may be determined to be associated with that prioritization event.

In some cases, the AP device 104 may be further configured to determine a wake interval frequency to be implemented on each of the STA devices determined to be associated with the prioritization event. In some cases, this may involve determining an amount of time to after which wake intervals are to recur. As described in greater detail elsewhere, the wake interval frequency may be determined based on a responsiveness level to be associated with the prioritization event as well as information about the STA device on which the wake interval frequency is to be implemented.

Once the AP device 104 has identified at least one STA device associated with a prioritization event, the AP device may provide instructions to the STA device to cause that the STA device to implement the wake interval frequency at 512. Upon receiving those instructions, the STA device 106 may implement that wake interval frequency by setting an amount of time between wake intervals at 514.

At 516, a user of the user device may interact with the user device in order to initiate an interaction with the STA device. In some embodiments, this may involve the selection of one or more options by the user device on a graphical user interface (GUI) implemented on the user device. For example, a user may select a button or other selection mechanism presented by the GUI that relates to a feature or action to be performed by a STA device 106. Information about the interaction may be provided to the remote system 108, which may then forward that information to the AP device 104 at 518 to be relayed to the STA device 106 at 520. In embodiments, a communication session may be initiated between the user device 110 and the STA device 106 through which information may be provided back and forth. Note that this communication session may continue to include one or more of the AP device 104 and the remote system 108.

Figure 6:
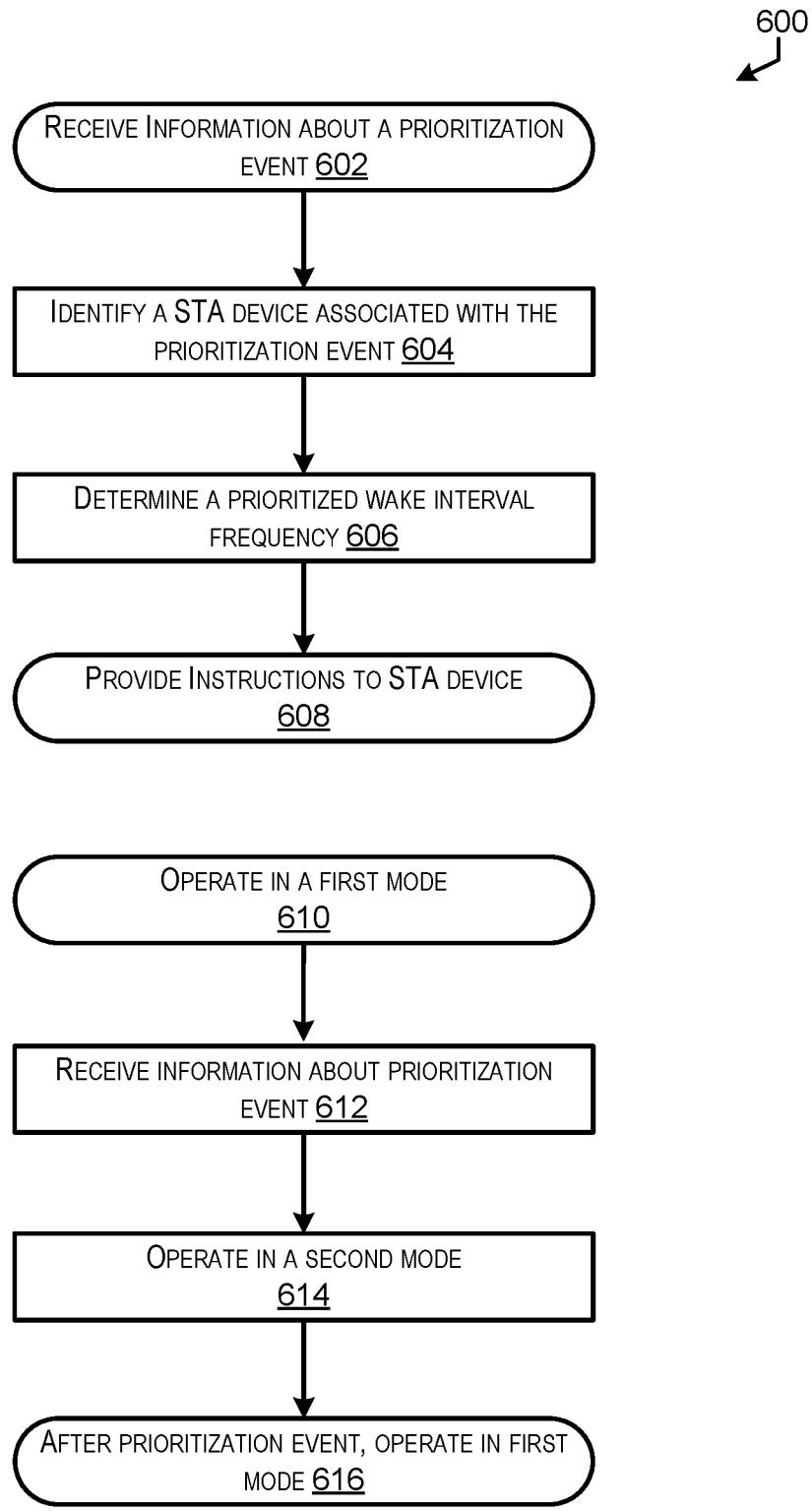
FIG. 6 depicts a flow diagram illustrating a process for adjusting wake intervals on a STA device based on prioritization events in accordance with at least some embodiments.

FIG. 6 depicts a flow diagram illustrating a process for adjusting wake intervals on a STA device based on prioritization events in accordance with at least some embodiments. While the process 600 is depicted as a series of blocks, it should be noted that the steps described in relation to process 600 may be performed in any suitable order. The process 600 may be performed between devices within a network, such as an access point (AP) device and a station (STA) device within a network. For example, the process 600 may be performed by an example of the AP device 104 and STA device 106 as described in relation to FIG. 1 above. As noted elsewhere, one or more AP device may be in wireless communication with one or more STA device.

At 602, the process 600 may involve receiving (e.g., at a AP device) information about a prioritization event. In some embodiments, the information associated with the prioritization event is received from a user device. For example, the information associated with the prioritization event may be information about a software application that has been executed, or otherwise accessed, on a user's mobile phone. In some embodiments, the information associated with the prioritization event is received from a STA device. Note that this may be the same or a different STA device that is to have its wake interval frequency adjusted as described below. The information obtained from a STA device may include sensor data collected from one or more sensors installed within the STA device. For example, such information may include information obtained from at least one of a GPS device, a temperature sensor, a motion sensor, or a camera.

At 604, the process 600 may involve identifying a STA device associated with the prioritization event. In some embodiments, the prioritization event relates to a likelihood that a particular action may be taken by a user in relation to a particular STA device. For example, a prioritization event that relates to a video doorbell software application that is accessed on a user device may be determined to relate to a video doorbell (e.g., a STA device) installed at a home of that user. In this example, by accessing the software application, the prioritization event may represent that the user is likely to submit a request through that software application to the video doorbell (e.g., a request to communicate with a visitor, access a video, change settings, etc.). Accordingly, in the above example, the video doorbell is associated with the access of the software application on the user device by virtue of the likelihood that the user will interact with the doorbell device.

At 606, the process 600 may involve determining a prioritized wake interval frequency. In some cases, this may involve determining a time period at which the wake intervals are spaced (e.g., set to recur). As noted elsewhere, the time interval associated with the prioritized wake interval is different from a time interval used in the default (or typical) wake interval frequency. Notably, the time interval associated with the prioritized wake interval frequency is less than the time interval used in the default wake interval frequency. In some cases, the time interval is determined based on at least one of STA device attributes or a level of responsiveness associated with the prioritization event.

At 608, the process 600 may involve providing instructions (e.g., a command) to a STA device to cause the STA device to adjust its wake interval frequency. In some embodiments, the AP device may include, in such instructions, information about an appropriate wake interval frequency and/or an amount of time between wake intervals. In some cases, the AP device may further provide information on a period of time over which the wake interval frequency should be adjusted.

In some embodiments, the AP device may further make a determination that the prioritization event has ended. In some cases, this may involve determining that a period of time associated with that prioritization event has elapsed. For example, a prioritization event associated with an execution of a software application on a user device may be associated with a 30-minute time period, such that after 30 minutes of inactivity, that prioritization event may be determined to no longer be occurring. In some cases, a determination may be made that a prioritization event has ended based on one or more conditions associated with that prioritization event no longer being present. For example, a prioritization event associated with execution of a software application on a user device may be determined to have ended when the software application has been exited or ended.

At 610, the process 600 may involve the STA device operating in a first mode. In the first mode, the STA device may operate using a wake interval frequency in which wake intervals are spaced far apart in order to minimize battery consumption. In other words, the initial wake interval frequency of the STA device may be such that the radio transceiver is rarely activated to detect communications directed toward it. In such a mode, the STA device would use minimal power consumption. However, communications directed toward the STA device might be delayed until the next wake interval occurs.

At 612, the process 600 may involve receiving, at the STA device, instructions and/or information about a prioritization event. In some cases, the information may include an indication of a type or category of the prioritization event. In other cases, the STA device may not receive any information about the prioritization event itself but may instead just receive a command (e.g., instructions) to operate in a second mode. In some embodiments, the command may indicate a wake interval frequency to be implemented on the STA device. In other embodiments, the command may simply indicate that the STA device should operate in a second mode. In some embodiments, the command may indicate a time period over which the STA device should operate in the second mode.

At 614, the process 600 may involve the STA device operating in a second mode (e.g., a prioritized wake interval frequency). In the second mode, the STA device may operate using a wake interval frequency in which wake intervals are spaced closely in order to optimize response times. In other words, the prioritized wake interval frequency of the STA device may be such that the radio transceiver is frequently activated to detect communications directed toward it. In such a mode, communications directed toward the STA device would be received more quickly, though battery consumption by the STA device would be increased while it is in the second mode.

At 616, the process 600 may involve after determining that the prioritization event has ended, returning the STA device to operate in the first mode. In some embodiments, this may involve receiving an indication from the AP device that the prioritization event has ended. In some embodiments, this may involve determining that a predetermined amount of time has elapsed since the STA device has implemented the second mode. In some cases, the predetermined amount of time may vary based on a type or category of the prioritization event. In other cases, the predetermined amount of time may be a default amount of time.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An electronic device comprising:
a camera;
a passive infrared sensor;
a wireless communication component;
one or more processors;
one or more computer readable media storing processor executable instructions which, when executed using the one or more processors, perform operations comprising
accessing first data indicating a first amount of time between wake periods,
providing power to the wireless communication component at a first time that is based on the first data indicating the first amount of time between wake periods,
accessing second data indicating a second amount of time between wake periods, the second amount of time between wake periods being less than the first amount of time between wake periods,
based on sensor data generated using the passive infrared sensor,
providing power to the wireless communication component at a second time that is based on the second data indicating the second amount of time between wake periods,
accessing third data indicating a third amount of time corresponding to a time out interval,
based on the third amount of time having elapsed since the second time,
providing power to the wireless communication component at a third time that is based on the first data indicating the first amount of time between wake periods.

2. The electronic device of claim 1, wherein the one or more computer readable media store processor executable instructions which, when executed using the one or more processors, perform operations comprising
determining, based on the sensor data generated using the passive infrared sensor, a first motion detection event; and
wherein the providing of power to the wireless communication component at the second time is based on the determining of the first motion detection event.

3. The electronic device of claim 1, wherein the one or more computer readable media store processor executable instructions which, when executed using the one or more processors, perform operations comprising
determining, based on image data generated using the camera, a first motion detection event; and
wherein the providing of power to the wireless communication component at the second time is based on the determining of the first motion detection event.

4. An electronic device comprising:
a camera;
a wireless communication component;
one or more processors;
one or more computer readable media storing processor executable instructions which, when executed using the one or more processors, perform operations comprising
providing power to the wireless communication component at a first time that is based on first data indicating a first wake-up frequency,
receiving, using the wireless communication component, a first command,
based on the receiving of the first command, performing a first set of operations in satisfaction of the first command,
powering down the wireless communication component,
based on the performing of the first set of operations, providing power to the wireless communication component at a second time that is based on second data indicating a second wake-up frequency, thereafter, based on third data indicating a time out interval,
providing power to the wireless communication component at a third time that is based on the first data indicating the first wake-up frequency.

5. The electronic device of claim 4, wherein the first data indicating the first wake-up frequency comprises data indicating a first amount of time between wake periods, and the second data indicating the second wake-up frequency comprises data indicating a second amount of time between wake periods.

6. The electronic device of claim 4, wherein the first data indicating the first wake-up frequency indicates a first number of wake-up periods in a defined time period.

7. The electronic device of claim 4, wherein the first data indicating the first wake-up frequency indicates a rate of wake-up periods.

8. The electronic device of claim 4, wherein the first data indicating the first wake-up frequency comprises data indicating a first amount of time between listening periods, and the second data indicating the second wake-up frequency comprises data indicating a second amount of time between listening periods.

9. The electronic device of claim 4, wherein the one or more computer readable media store processor executable instructions which, when executed using the one or more processors, perform operations comprising
storing the first data indicating the first wake-up frequency, and
accessing the first data indicating the first wake-up frequency.

10. The electronic device of claim 4, wherein the first command is a command to initiate a live view.

11. The electronic device of claim 4, wherein the first command is a command to send image data captured by the camera.

12. The electronic device of claim 4, wherein the first wake-up frequency is once every two seconds, and the second wake-up frequency is once every second.

13. The electronic device of claim 4, wherein the first data indicating the first wake-up frequency comprises data indicating a first amount of time between wake periods, and the second data indicating the second wake-up frequency comprises data indicating a second amount of time between wake periods, and wherein the first amount of time is two seconds, and the second amount of time is one second.

14. The electronic device of claim 4, wherein the one or more computer readable media store processor executable instructions which, when executed using the one or more processors, perform operations comprising
receiving data indicating the first wake-up frequency, and
based on the receiving of data indicating the first wake-up frequency, storing the first data indicating the first wake-up frequency.

15. The electronic device of claim 4, wherein the one or more computer readable media store processor executable instructions which, when executed using the one or more processors, perform operations comprising
receiving data indicating the second wake-up frequency, and
based on the receiving of data indicating the second wake-up frequency, storing the second data indicating the second wake-up frequency.

16. An electronic device comprising:
a camera;
a wireless communication component;
one or more processors;
one or more computer readable media storing processor executable instructions which, when executed using the one or more processors, perform operations comprising
providing power to the wireless communication component at a first time that is based on first data indicating a first wake-up frequency,
receiving, using the wireless communication component, a first message,
powering down the wireless communication component,
based on the receiving of the first message,
providing power to the wireless communication component at a second time that is based on second data indicating a second wake-up frequency, thereafter, based on third data indicating a time out interval,
providing power to the wireless communication component at a third time that is based on the first data indicating the first wake-up frequency.

17. The electronic device of claim 16, wherein the first message was sent by a remote system based on determining that a user opened a first application on a user device.

18. The electronic device of claim 16, wherein the first message comprises the second data indicating the second wake-up frequency.

19. The electronic device of claim 16, wherein the first message comprises the third data indicating the time out interval.

20. A method comprising:
receiving, at a remote system from a user device, first data indicating that a first application is open on the user device;
based on the receiving of the first data indicating that the first application is open on the user device, sending, from the remote system to a camera device, second data indicating to increase a wake-up frequency of the camera device.

21. The method of claim 20, wherein the second data indicates a wake-up frequency.

22. The method of claim 20, wherein the second data indicates an amount of time between wake periods.

23. The method of claim 20, wherein the second data indicates an amount of time between listen periods.

24. The method of claim 20, wherein the second data indicates a time out interval.

25. The method of claim 20, wherein the first data indicates that a user has recently opened the first application.

26. The method of claim 20, wherein the first data is a request for data.

27. An electronic device comprising:
a camera;
a wireless communication component;
one or more processors;
one or more computer readable media storing processor executable instructions which, when executed using the one or more processors, perform operations comprising
providing power to the wireless communication component at a first time that is based on first data indicating a first wake-up frequency,
based on first data generated using a first sensor of the electronic device,
providing power to the wireless communication component at a second time that is based on second data indicating a second wake-up frequency, thereafter, based on third data indicating a time out interval,
providing power to the wireless communication component at a third time that is based on the first data indicating the first wake-up frequency.

28. The electronic device of claim 27, wherein the first sensor is an image sensor of the camera device, and the first data is image data.

29. The electronic device of claim 27, wherein the first sensor is a motion sensor.

* * * * *